United States Patent
Kim et al.

(10) Patent No.: US 9,843,667 B2
(45) Date of Patent: Dec. 12, 2017

(54) ELECTRONIC DEVICE AND CALL SERVICE PROVIDING METHOD THEREOF

(71) Applicant: Samsung Electronics Co., Ltd., Gyeonggi-do (KR)

(72) Inventors: Jinkyu Kim, Seoul (KR); Sangwook Shin, Seoul (KR); Sungwan Youn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/352,755

(22) Filed: Nov. 16, 2016

(65) Prior Publication Data

US 2017/0149961 A1 May 25, 2017

(30) Foreign Application Priority Data

Nov. 25, 2015 (KR) .......................... 10-2015-0165384

(51) Int. Cl.
*H04M 1/725* (2006.01)
*H04M 3/428* (2006.01)

(52) U.S. Cl.
CPC ..... *H04M 1/72597* (2013.01); *H04M 3/4288* (2013.01); *H04M 2201/60* (2013.01)

(58) Field of Classification Search
CPC ........... H04M 1/72597; H04M 3/4288; H04M 2201/60
USPC ....................................................... 455/567
See application file for complete search history.

(56) References Cited

U.S. PATENT DOCUMENTS

| | | | | |
|---|---|---|---|---|
| 6,594,346 B2 * | 7/2003 | Engelke | .............. | H04M 11/066 379/100.09 |
| 7,023,979 B1 * | 4/2006 | Wu | ..................... | H04M 3/5233 379/265.11 |
| 7,106,843 B1 * | 9/2006 | Gainsboro | .......... | H04M 3/2281 379/191 |
| 7,123,707 B1 * | 10/2006 | Hiri | ................... | H04L 29/06027 379/215.01 |

(Continued)

FOREIGN PATENT DOCUMENTS

KR 10-2012-0069074 A 6/2012

*Primary Examiner* — Hai V Nguyen
(74) *Attorney, Agent, or Firm* — Cha & Reiter, LLC.

(57) ABSTRACT

A call service providing method and an electronic device thereof are provided. The electronic device includes: at least one communication circuit supporting at least one communication protocol; a display; a microphone; a speaker; an input device which is configured with or separated from the display; a control circuit electrically coupled to the communication circuit, the display, the microphone, the speaker, and the input device; and a memory electrically coupled to the control circuit. The memory stores instructions executable by the control circuit to: receive a first call from a first external electronic device via the at least one communication circuit; during the first call, receive a request for a second call from a second external electronic device via the at least one communication circuit; receive the second call based on input via the input device; convert a first voice data from the second external electronic device to a first text data and display the first text data on the display; and convert a second text data inputted via the input device to a second voice data and transmit the second voice data to the second external electronic device. Various other embodiments are provided.

21 Claims, 11 Drawing Sheets

(56) References Cited

U.S. PATENT DOCUMENTS

| | | | | |
|---|---|---|---|---|
| 7,133,513 B1* | 11/2006 | Zhang | H04M 3/42221 379/202.01 |
| 7,889,847 B2* | 2/2011 | Gainsboro | H04M 3/2281 379/188 |
| 8,032,409 B1* | 10/2011 | Mikurak | G06Q 10/00 705/14.39 |
| 8,068,595 B2* | 11/2011 | Odinak | H04M 3/42221 379/265.01 |
| 8,180,406 B2* | 5/2012 | Lim | H04M 3/4234 340/7.58 |
| 8,442,197 B1* | 5/2013 | Mazza | H04M 3/56 370/260 |
| 8,862,078 B2* | 10/2014 | Yu | H04W 76/025 370/280 |
| 9,349,112 B2* | 5/2016 | Gazdzinski | G06Q 10/08 |
| 9,380,146 B1* | 6/2016 | Gopalakrishnan | H04M 1/72552 |
| 9,456,074 B2* | 9/2016 | Kim | G10L 15/26 |
| 2002/0161578 A1* | 10/2002 | Saindon | G10L 15/26 704/235 |
| 2007/0041545 A1* | 2/2007 | Gainsboro | H04M 3/2281 379/188 |
| 2009/0234655 A1* | 9/2009 | Kwon | 704/270.1 |
| 2009/0299743 A1* | 12/2009 | Rogers | H04M 1/274516 704/235 |
| 2011/0263223 A1* | 10/2011 | Lim | H04M 3/4234 455/411 |
| 2014/0273974 A1* | 9/2014 | Varghese | H04M 3/42246 455/412.1 |
| 2015/0340037 A1* | 11/2015 | Kim | G10L 15/26 704/235 |
| 2015/0341481 A1* | 11/2015 | Kim | G10L 15/26 455/414.1 |
| 2016/0005393 A1* | 1/2016 | Patil | G10L 13/04 704/260 |
| 2016/0088150 A1* | 3/2016 | Lam | H04M 3/42221 370/259 |
| 2016/0255494 A1* | 9/2016 | Shin | H04L 51/16 455/415 |
| 2016/0344869 A1* | 11/2016 | Patel | H04L 51/066 |
| 2017/0013106 A1* | 1/2017 | Kim | G10L 15/26 |
| 2017/0085506 A1* | 3/2017 | Gordon | H04L 51/046 |

* cited by examiner

ELECTRONIC DEVICE AND CALL SERVICE PROVIDING METHOD THEREOF

CLAIM OF PRIORITY

This application claims the benefit under 35 U.S.C. §119 (a) of a Korean patent application filed on Nov. 25, 2015, in the Korean Intellectual Property Office and assigned Serial No. 10-2015-0165384, the entire disclosure of which is hereby incorporated by reference.

BACKGROUND

1. Field of the Disclosure

The present disclosure relates to a method and apparatus for controlling a plurality of calls.

2. Description of Related Art

Electronic devices have been developed to provide various functions. Examples of such functions include allowing the user of the electronic device to take still images, videos, etc., multimedia playback, e.g., playing music files, video files, etc., games, navigation services, etc.

Electronic devices also provide communication services such as voice communications and SMS/MMS text messages, etc.

Typically, when the user is in a voice communication session, i.e. a voice call with another user, the user may receive a new call from a third user. In those instances, the user may need to select one of the existing call and the new call, and hold or reject the other call.

SUMMARY

The present disclosure has been made to address the above problems and disadvantages, and to provide at least the advantages described below. Various embodiments of the present disclosure provide a call service providing method which is capable of performing calls with a number of parties simultaneously, including an existing call of the user and a new call that the user receives. Various embodiments of the present disclosure also provide an electronic device adapted to the call service providing method thereof.

In accordance with an aspect of the present disclosure, an electronic device is provided. The electronic device includes: at least one communication circuit supporting at least one communication protocol; a display; a microphone; a speaker; an input device which is configured with or separated from the display; a control circuit electrically coupled to the communication circuit, the display, the microphone, the speaker, and the input device; and a memory electrically coupled to the control circuit. The memory stores instructions executable by the control circuit to: receive a first call from a first external electronic device via the at least one communication circuit; during the first call, receive a request for a second call from a second external electronic device via the at least one communication circuit; receive the second call based on input via the input device; convert a first voice data from the second external electronic device to a first text data and display the first text data on the display; and convert a second text data inputted via the input device to a second voice data and transmit the second voice data to the second external electronic device.

In accordance with another aspect of the present disclosure, an electronic device is provided. The electronic device includes: a communication module; and a control circuit. The control circuit is configured to: receive a request for a second call from a second party while the electronic device is connected with a first party in a first call; and control the communication module to connect the second call with the second party while maintaining the first call, according to an input from a user of the electronic device, wherein the first call is connected in a first communication mode and the second call is connected in a second communication mode.

In accordance with another aspect of the present disclosure, a call service providing method of an electronic device is provided. The method includes: receiving a first call from a first external electronic device via at least one communication circuit; during the first call, receiving a request for a second call from a second external electronic device via the at least one communication circuit; receiving the second call based on input via an input device; converting a first voice data from the second external electronic device to a first text data and displaying the first text data on the display; and converting a second text data inputted via the input device to a second voice data and transmitting the second voice data to the second external electronic device.

In accordance with another aspect of the present disclosure, a call service providing method of an electronic device is provided. The method includes: providing a user of the electronic device with a first call from a first party; receiving a request for a second call from a second party while providing the first call; and controlling a communication module to connect the second call with the second party while maintaining the first call, according to an input from a user of the electronic device, wherein the first call is connected in a first communication mode and the second call is connected in a second communication mode.

BRIEF DESCRIPTION OF THE DRAWINGS

The above and other aspects, features and advantages of the invention will be more apparent from the following detailed description, taken in conjunction with the accompanying drawings, in which.

DETAILED DESCRIPTION

Figure 1:
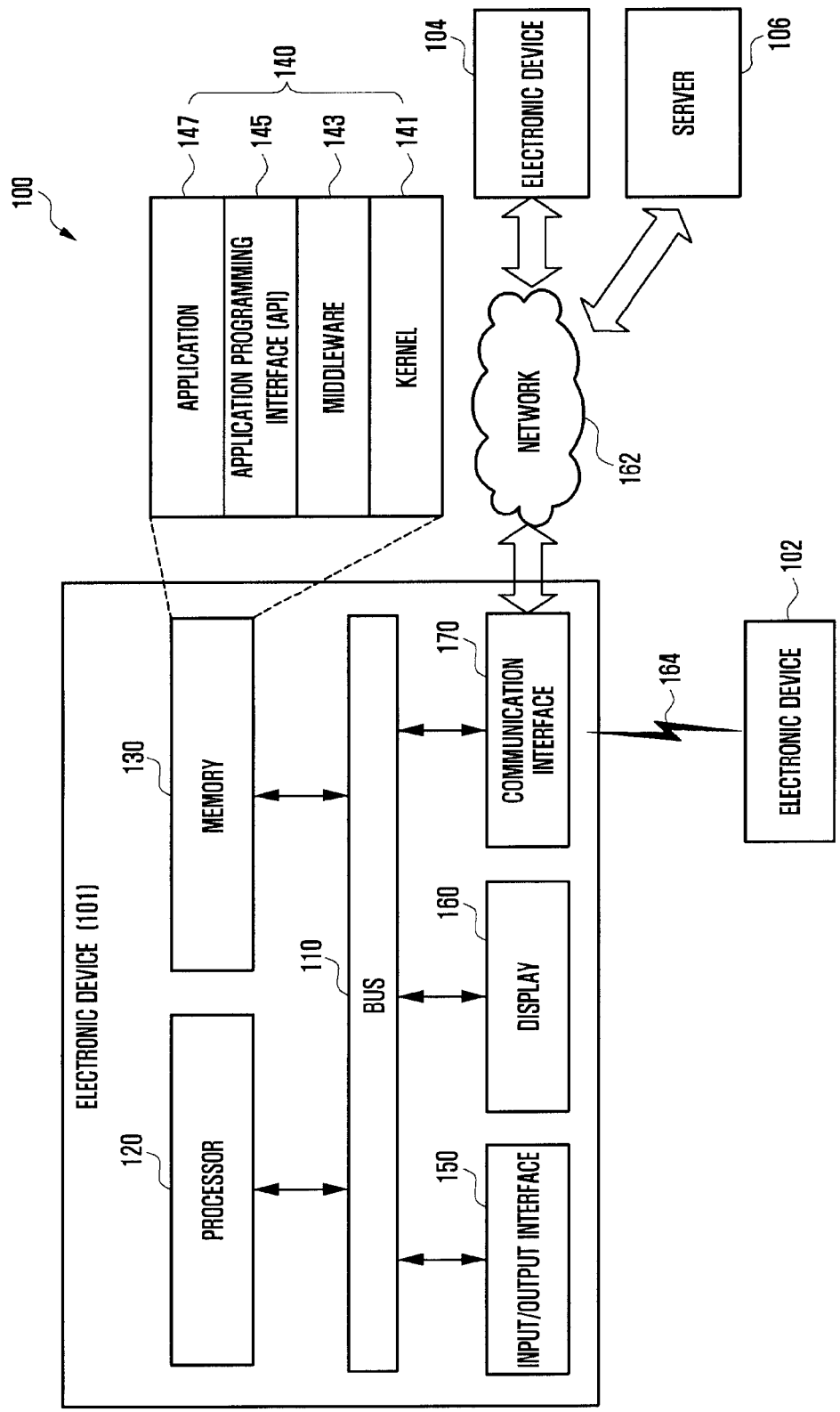
FIG. 1 is a block diagram showing a network environment including electronic devices according to one embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the dictionary meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung Home-Sync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram illustrating a configuration of an electronic device according to an embodiment of the present disclosure.

Referring to FIG. 1, the electronic device 101 may include a bus 110, a processor 120, a memory 130, a input/output interface 150, a display 160 and a communication interface 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, input/output interface 150, the display 160, the communication interface 170, etc.) through the bus 110, may interpret the received commands, and may execute calculation or data processing according to the interpreted commands. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

The memory 130 may store commands or data received from the processor 120 or other elements (e.g., the input/output interface 150, a display 160 and a communication interface 170, etc.) or generated by the processor 120 or the other elements. The memory 130 may include programming modules, such as a kernel 131, middleware 132, an Application Programming Interface (API) 133, an application 134, and the like. Each of the above-described programming modules may be implemented in software, firmware, hardware, or a combination of two or more thereof.

The kernel 131 may control or manage system resources (e.g., the bus 110, the processor 120, the memory 130, and/or other hardware and software resources) used to execute operations or functions implemented by other programming modules (e.g., the middleware 132, the API 133, and the application 134). Also, the kernel 131 may provide an interface capable of accessing and controlling or managing the individual elements of the electronic device 101 by using the middleware 132, the API 133, or the application 134.

The middleware 132 may serve to go between the API 133 or the application 134 and the kernel 131 in such a manner that the API 133 or the application 134 communicates with the kernel 131 and exchanges data therewith. Also, in relation to work requests received from one or more applications 134 and/or the middleware 132, for example, may perform load balancing of the work requests by using a method of assigning a priority, in which system resources (e.g., the bus 110, the processor 120, the memory 130, etc.) of the electronic device 101 can be used, to at least one of the one or more applications 134.

The API 133 is an interface through which the application 134 is capable of controlling a function provided by the kernel 131 or the middleware 132, and may include, for example, at least one interface or function for file control, window control, image processing, character control, or the like.

The input/output interface 150, for example, may receive a command or data as input from a user, and may deliver the received command or data to the processor 120 or the memory 130 through the bus 110. The display module 160 may display a video, an image, data, or the like to the user.

The communication interface module 170 may connect communication between another electronic device 102 and the electronic device 101. The communication interface module 170 may support a predetermined short-range communication protocol (e.g., Wi-Fi, BlueTooth (BT), and Near Field Communication (NFC)), or predetermined network 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 101. Further, the communication interface module 170 may connect communication between a server 164 and the electronic device 101 via the network 162.

Figure 2:
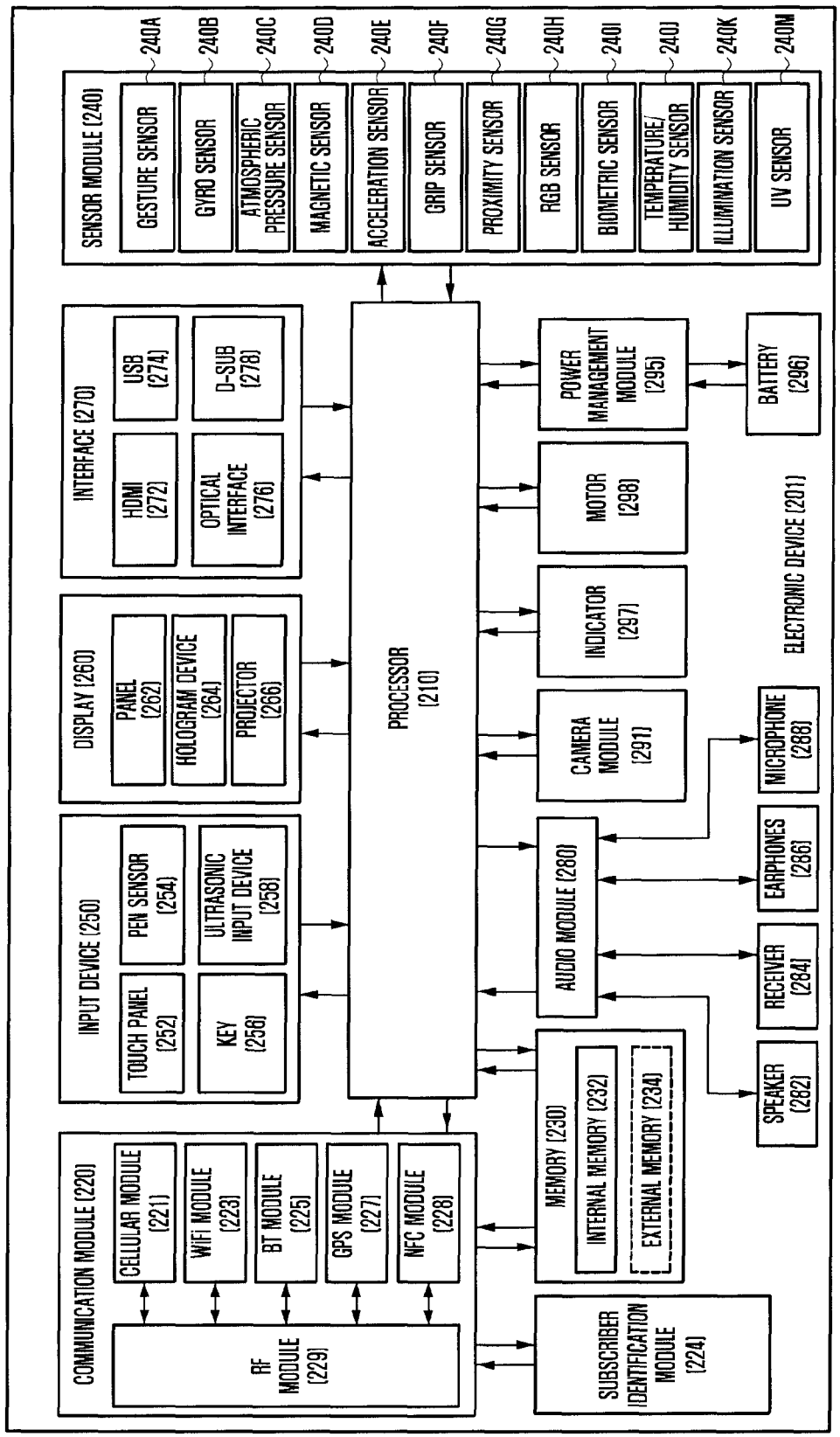
FIG. 2 is a block diagram of an electronic device according to one embodiment of the present disclosure.

FIG. 2 is a block diagram illustrating a configuration of an electronic device 201 according to an embodiment of the present disclosure.

The hardware shown in FIG. 2 may be, for example, the electronic device 101 illustrated in FIG. 1.

Referring to FIG. 2, the electronic device may include one or more processors 210, a communication module 220, a Subscriber Identification Module (SIM) card 224, a memory 230, a sensor module 240, a input device 250, a display module 260, an interface 270, an audio module 280, a camera module 291, a power management module 295, a battery 296, an indicator 297, a motor 298 and any other similar and/or suitable components.

The Application Processor (AP) 210 (e.g., the processor 120) may include one or more Application Processors (APs), or one or more Communication Processors (CPs). The processor 210 may be, for example, the processor 120 illustrated in FIG. 1. The AP 210 is illustrated as being included in the processor 210 in FIG. 2, but may be included in different Integrated Circuit (IC) packages, respectively. According to an embodiment of the present disclosure, the AP 210 may be included in one IC package.

The AP 210 may execute an Operating System (OS) or an application program, and thereby may control multiple hardware or software elements connected to the AP 210 and may perform processing of and arithmetic operations on various data including multimedia data. The AP 210 may be implemented by, for example, a System on Chip (SoC). According to an embodiment of the present disclosure, the AP 210 may further include a Graphical Processing Unit (GPU) (not illustrated).

The AP 210 may manage a data line and may convert a communication protocol in the case of communication between the electronic device (e.g., the electronic device 101) including the hardware and different electronic devices connected to the electronic device through the network. The AP 210 may be implemented by, for example, a SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 210, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 101. The SIM card 224 may include unique identification information (e.g., Integrated Circuit Card IDentifier (ICCID)) or subscriber information (e.g., International Mobile Subscriber Identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a Solid State Drive (SSD). The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 220 may include a cellular module 221, a wireless (WiFi) communication module 223 or a Radio Frequency (RF) module 229. The communication module 220 may be, for example, the communication interface 170 illustrated in FIG. 1. The communication module 220 may include, for example, a Wi-Fi part 223, a BT part 225, a GPS part 227, or a NFC part 229. For example, the wireless communication module 220 may provide a wireless communication function by using a radio frequency. Additionally or alternatively, the wireless communication module 220 may include a network interface (e.g., a LAN card), a modulator/demodulator (modem), or the like for connecting the hardware to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a Power Amplifier Module (PAM), a frequency filter, a Low Noise Amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an barometer sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illuminance sensor 240K, and a Ultra Violet (UV) sensor 240M. The sensor module 240 may measure a physical quantity or may sense an operating state of the electronic device 101, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware may receive a user input from an external device (e.g., a network, a computer, or a server), which is connected to the communication module 220, through the communication module 220.

The display module 260 may include a panel 262, a hologram 264, or projector 266. The display module 260 may be, for example, the display module 160 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include, for example, a High-Definition Multimedia Interface (HDMI) 272, a Universal Serial Bus (USB) 274, an optical interface 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the hardware. Although not illustrated, the power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware or a part (e.g., the AP 211) of the hardware, for example, a booting state, a message state, a charging state and the like. The motor 298 may convert an electrical signal into a mechanical vibration. The processor 210 may control the sensor module 240.

Although not illustrated, the hardware may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware according to an embodiment of the present disclosure may include one or more components, and the name of the relevant element may change depending on the type of electronic device. The hardware according to an embodiment of the present disclosure may include at least one of the above-described elements. Some of the above-described elements may be omitted from the hardware, or the hardware may further include additional elements. Also, some of the elements of the hardware according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations which have been known or are to be developed in the future.

Figure 3:
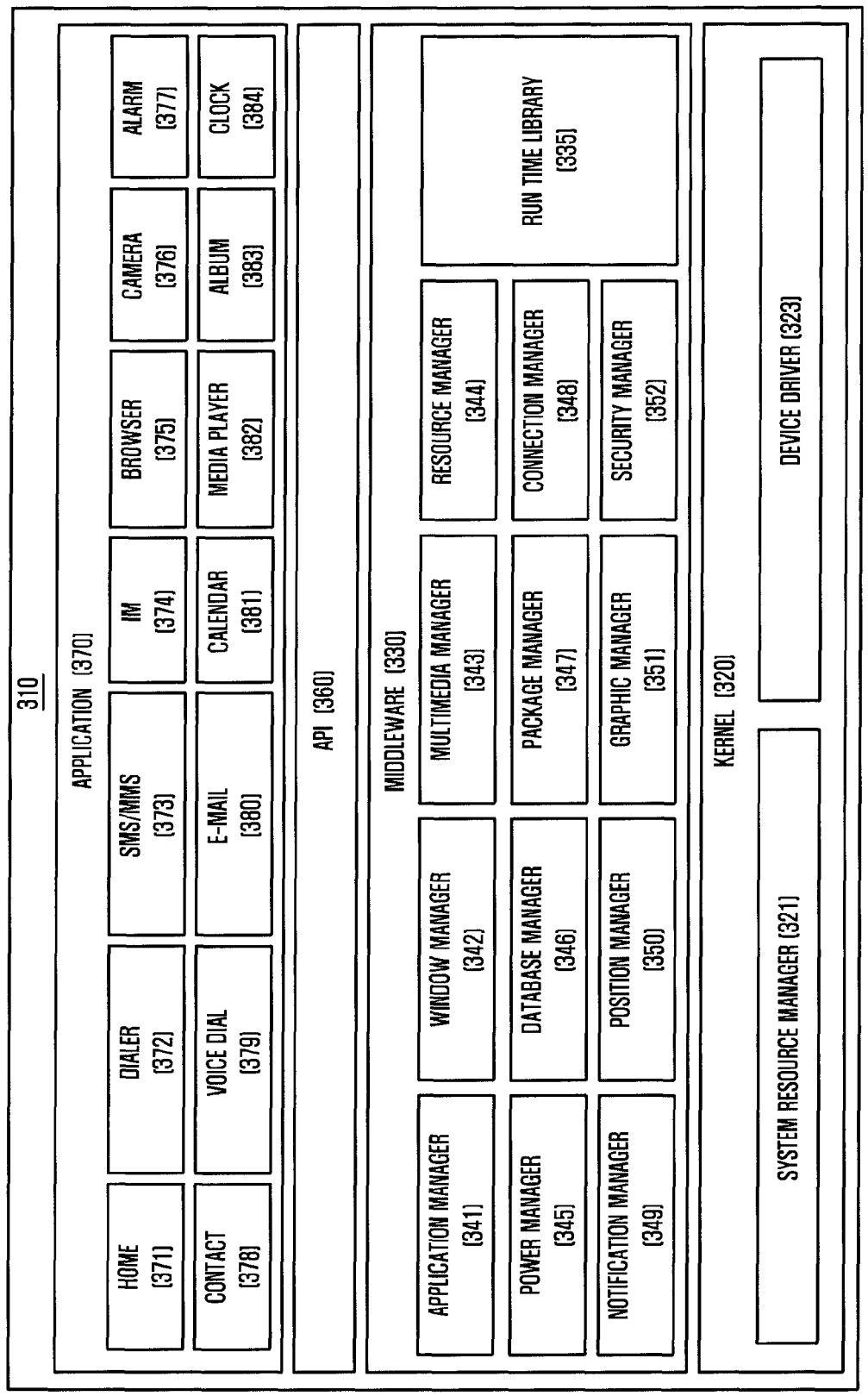
FIG. 3 is a block diagram of one or more program modules according to one embodiment of the present disclosure.

FIG. 3 is a block diagram illustrating a configuration of one or more programming modules 300 according to an embodiment of the present disclosure.

The programming module 300 may be included (or stored) in the electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the hardware), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 131) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

Figure 4:
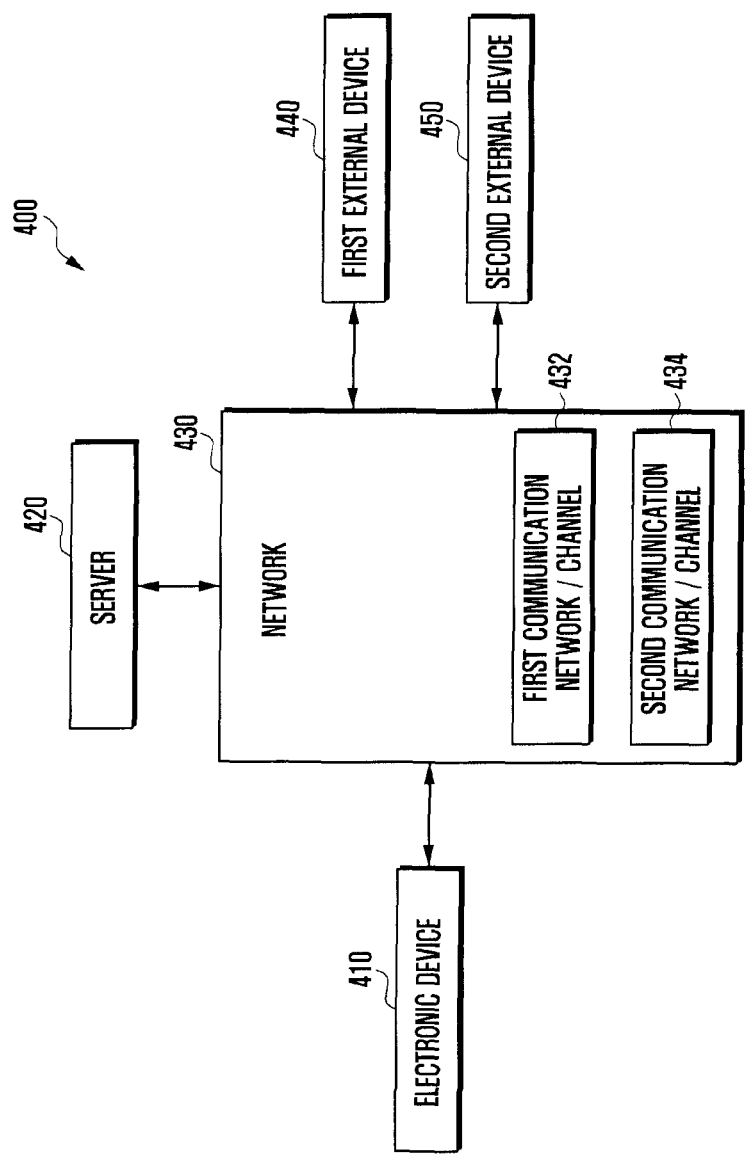
FIG. 4 is a block diagram showing a network environment including electronic devices according to one embodiment of the present disclosure.

FIG. 4 is a block diagram showing a network environment 400 including electronic device 410 according to one embodiment of the present disclosure.

With reference to FIG. 4, the network environment 400 may be configured to be similar or identical to the network environment 100 shown in FIG. 1. The electronic device 410 may be configured to be similar or identical to the electronic device 101 shown in FIG. 1. The electronic device 410 is capable of connecting to a server 420 (e.g., server 106), and external devices 440 and 450 (e.g., the electronic device 102 and the electronic device 104) via the network 430 in the network environment 400. In the embodiment, the external devices 440 and 450 refer to devices which are owned by other users or parties and include a communication module with a call function. Examples of external devices 440 and 450 may include mobile phones known in the art.

In the network environment 400 configured as described above, a call service providing method according to the present disclosure allows a user of the electronic device 410 to initiate a second call with a second party while connected to a first call with a first party, so that the user can make calls with a number of parties simultaneously. To this end, the electronic device 410 maintains the existing call in a voice call mode via the first communication network 432 of the network 430 and may initiate the new call in a text-speech conversion mode via the second communication network 434 of the network 430.

The first communication network 432 may be a circuit switching (CS) network providing a voice call service. The second communication network 434 may be a packet switching (PS) network providing a data transmission/reception service. In another embodiment, the first communication network 432 and second communication network 434 may be first and second channels in the same communication network.

In particular, the electronic device 410 converts a text message input by the user into a speech message (TTS service) and transmits the speech message to the network 430 (e.g., network 162). The electronic device 410 also converts a speech message, received from the second party via the network 430, into a text message (STT service), and provides the text message to the user. In various embodiments, the conversion between text and speech (TTS service and STT service) may be independently performed by the electronic device 410 or performed by the electronic device 410 in further cooperation with the server 420. The following description is described based on the conversion between text and speech (TTS service and STT service) which is independently performed by the electronic device 410. However, it should be understood that the present disclosure is not limited thereto.

Figure 5:
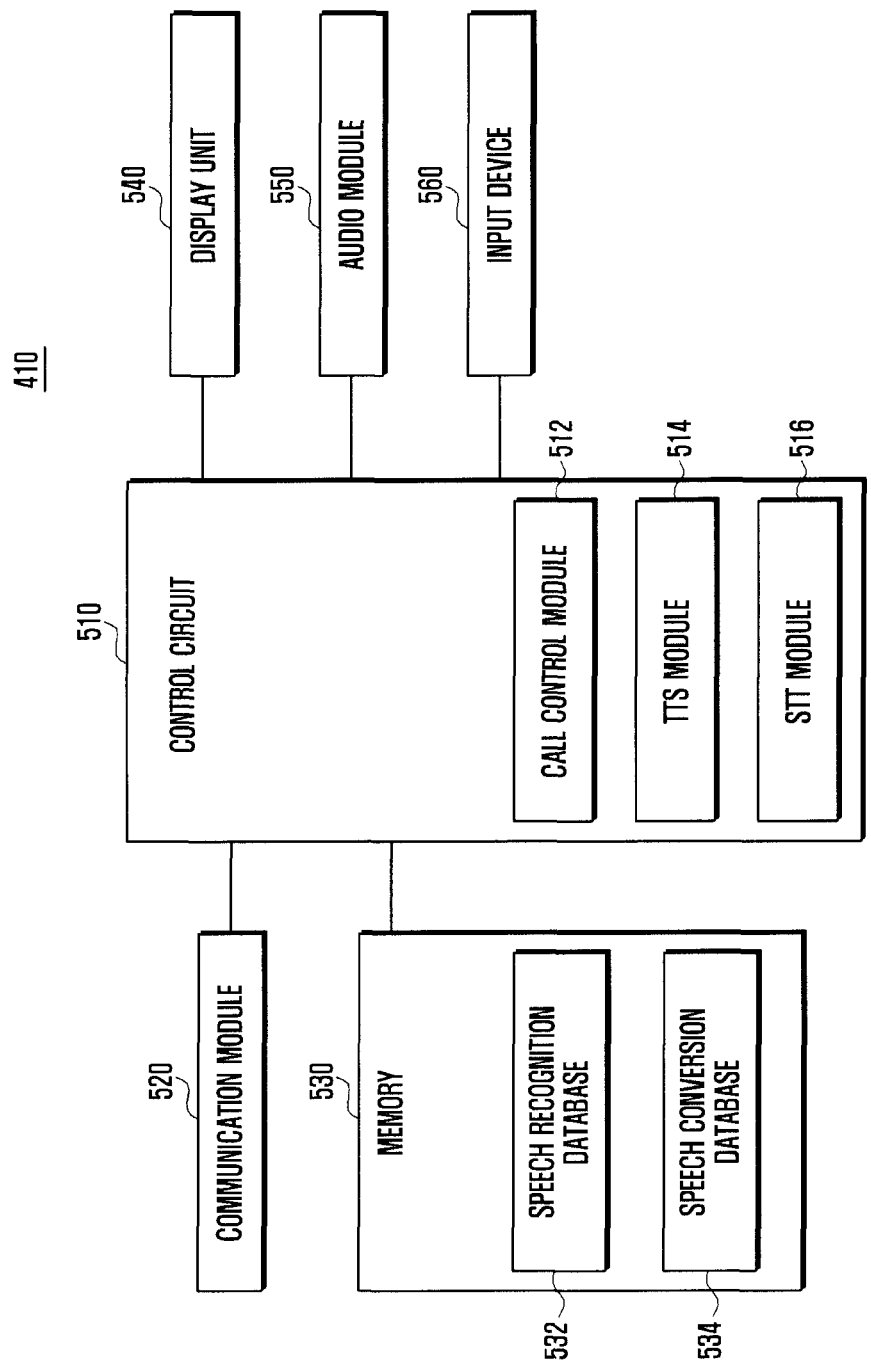
FIG. 5 is a detailed block diagram of an electronic device according to one embodiment of the present disclosure.

FIG. 5 is a detailed block diagram of an electronic device 410 according to one embodiment of the present disclosure.

With reference to FIG. 5, the electronic device 410 (e.g., electronic device 101) may include a control circuit 510, a communication module 520, a memory 530, a display unit 540, an audio module 550, and an input device 560.

The control circuit 510 (e.g., processor 120) may include a call control module 512, a TTS module 514, and an STT module 516. The control circuit 510 may include part or all of an application processor (AP) and/or software programs stored in the memory.

The call control module 512 controls the call function of the electronic device 410. The call control module 512 controls the communication module 520 to initiate and connect one or more calls to specified parties according to a user's request. The call control module 512 may also detect that the user has received a request to connect a call from a second party during a call with a first party, and provides the user with a call service in a text-speech conversion mode. When the call control module 512 receives a third call request of a third party, it is capable of providing the user with a call service in a speech-text conversion mode for the third call. To this end, the call control module 512 is capable of controlling the TTS module 514 and the STT module 516. The call control module 512 may detect a communication network or channel that the electronic device 410 is currently using, and also additionally other available communication networks or channels. Therefore, the electronic device 410 is capable of making a new call (e.g., a call in a text-speech conversion mode) via one of the other available communication networks or channels other than the communication network/channel currently in use for the existing call.

The call control module 512 controls the call service in a text-speech conversion mode according to a user's request. The call control module 512 provides the TTS module 514 with text input by the user or text data received from the external electronic device, and controls the TTS module 514 to convert the text or text data into voice signals. The call control module 512 also provides the voice signals converted by the TTS module 514 to either the external electronic device via the communication module 520 or to the user via the speaker (e.g. the audio module 550). In another embodiment, transmission of the voice signals may be performed by the TTS module 514.

The call control module 512 also controls the call service in a speech-text conversion mode according to a user's request. The call control module 512 transfers voice signals, provided by the speaker or received from the external electronic device, to the STT module 516 and controls the STT module 516 to convert the voice signals into text data based on a speech recognition database. The call control module 512 provides text converted by the STT module 516 to either the external electronic device via the communication module 520 or to the user via the display unit 540. In another embodiment, transmission of the text data may be performed by the STT module 516.

The TTS module 514 converts text into voice signals. In one embodiment, the TTS module 514 converts text into voice signals by creating voice signals based on the text. To this end, the TTS module 514 manages and operates a database which includes text information corresponding to languages and speech information. In one embodiment, the TTS module 514 may collect voice-related features of received voice signals, including pitch, tone, voice features, etc., and applies the collected voice-related features to the voice signals it generates. That is, when the TTS module 514 converts text into a voice signal, it collects voice-related features of the user's voice, and creates a voice signal similar to the user's voice in terms of pitch, tone, etc. To this end, the TTS module 514 may include components for adjusting voice features, such as pitch, tone, etc. to create voice signals of various timbres. For example, the TTS module 514 is capable of creating voice signals corresponding to the user's gender. The TTS module 514 is also capable of controlling the creation of voice signals corresponding to the user's voice tones, e.g., high tone, low tone, etc. In another embodiment, when the function of converting text into voice signals is designed to be performed by a separate TTS server, the TTS module 514 is capable of connecting to the TTS server via the communication module 520, providing text data to the server, and receiving corresponding voice signals from the server.

The STT module 516 performs the speech recognition for voice signals provided by the call control module 512 and creates text data from the voice signals. To this end, the STT module 516 is capable of operating a speech recognition database and performing the speech recognition for voice signals based on the database. In one embodiment, when a speech recognition for text data generation is designed to be performed in conjunction with a separate automatic speech recognition (ASR) server, the STT module 516 is capable of connecting to the ASR server via the communication module 520, providing voice signals to the server, and receiving corresponding text information from the server.

The communication module 520 (e.g., communication interface 170) is capable of establishing a data communication channel with another electronic device via the network environment 400. The communication module 520 may be configured to support various communication modes according to characteristics of electronic device 410. For example, the communication module 520 may be a mobile communication module capable of supporting 2G, 3G, 4G, etc., a communication module capable of supporting WiFi, etc. In particular, the communication module 520 is capable of establishing a data communication channel for performing the transmission/reception of text data with the other electronic device according to user input, while simultaneously maintaining a voice communication connection with a third electronic device. In one embodiment, the data communication channel is used to transmit at least one of the following: text data created via the speech recognition, voice signals, videos, text input via the input device 560, etc.

The memory 530 (e.g., memory 130) is capable of storing an operating system of the electronic device 410, application programs for supporting various functions of the electronic device, etc. In particular, the memory 530 is capable of storing application programs for supporting a TTS service and an STT service, a speech recognition database 532 for supporting the speech recognition, a speech conversion database 534, etc.

When the electronic device 410 is designed to perform the speech recognition, the speech recognition database 532, locally stored in memory 530 is capable of supporting the speech recognition function. Although the local speech recognition database 532 may have a relatively low level of reliability and a relatively slow operating speed for the speech recognition result, compared with the ASR server, it is capable of supporting a speech recognition customized to the user of the electronic device 410. That is, the speech recognition database 532 stores a speech recognition history of voice signals input by the user, and includes results that match the user's voice signals and previously stored voice patterns and texts. Therefore, the speech recognition database storing data internally by itself is capable of supporting the speech recognition function and may be customized to the particular user of the electronic device, unlike the ASR server, which is not customized to this particular user because the ASR server serves a multitude of devices. To this end, the speech recognition database 532 is capable of providing a learning function, under the control of the control circuit 510. The learning function is performed in such a way that, when matching a voice signal input by the particular user of this electronic device with a text result, when an event for adjusting the voice signal to the text result occurs due to a user input, such as a correction, etc., the event is recorded and applied to subsequent speech recognition results. The learning function thereby increases the accuracy of the speech recognition result for voice signals of the user of the electronic device.

The speech conversion database 534 stores audio patterns of words, phrases, postposition/preposition/suffix/prefix, sentences, etc., so that when text is input, voice signals corresponding to the text input is generated. The speech conversion database 534 may be used to support a TTS service. In particular, the speech conversion database 534 may include a database created by matching text corresponding to one or more languages with voice signals corresponding to the text.

The display unit 540 (e.g., display 160) is capable of providing various screen interfaces required to operate the electronic device 410. The display unit 540 may be configured to include a display panel and a touch panel for supporting a touch sensing function. The display unit 540 is capable of providing screens according to types of communication services provided by the electronic device. For example, the display unit 540 is capable of outputting at least one of the following: a screen for supporting a voice call, a screen for supporting a call service in a text-speech conversion mode, and a screen for supporting a video call service.

The audio module 550 (e.g., audio module 280) includes a microphone and a speaker.

The microphone (e.g., microphone 288) is activated according to the activated functions of the electronic device 410 and collects the ambient audio signals, such as voice signals. The microphone transfers the collected voice signals to the control circuit 510. The control circuit 510, as explained above, converts the voice signals into text and transmits the text data via the communication module 520. In one embodiment, the voice signals are encoded according to the data transfer protocol, and transmitted to the speech recognition server via the communication module 520. The speech recognition server converts the voice signals into a text message and transmits the text message back to the electronic device 410 or to another electronic device (e.g. a counter party in a call).

The speaker (e.g., speaker 282) outputs audio signals of the electronic device 410. The speaker outputs audio data according to the playback of audio files which are stored in the electronic device 410 or received from an external server or another electronic device. When the electronic device receives a text message, a video, or the like from another electronic device (e.g. a counter party in a call), the speaker outputs a corresponding notification sound or ring tone. In one embodiment, the speaker is capable of outputting a notification sound according to an STT service converting text to a speech, under the control of the control circuit 510.

The input device 560 (e.g., input device 250) is capable of creating various input signals required to operate the electronic device 410. The input device 560 may be implemented in a form of specified keys, such as button keys, side keys, a home key, etc. Alternatively, the input device 560 may further be implemented with a virtual touch pad supported by a touch screen implemented in the display unit 540. The virtual touch pad may be configured to be displayed on the display unit 540 and create events corresponding to a user's touch inputs. The input device 560 is capable of creating: an input signal for connecting to a receiver with a communication service, an input signal for operating the communication service, an input signal for the input of text, an input signal for activating another communication service while providing a specified communication service, etc., according to a user's controls. The control circuit 510 receives the created input signal and supports a function corresponding to the input signal.

In an embodiment, an electronic device is implemented to include: at least one communication circuit supporting at least one communication protocol; a display; a microphone; a speaker; an input device which is configured with or separated from the display; a control circuit electrically coupled to the communication circuit, the display, the microphone, the speaker, and the input device; and a memory electrically coupled to the control circuit. The memory stores instructions executable by the control circuit to: receive a first call from a first external electronic device via the at least one communication circuit; during the first call, receive a request for a second call from a second external electronic device via the at least one communication circuit; receive the second call based on input via the input device; convert a first voice data from the second external electronic device to a first text data and display the first text data on the display; and convert a second text data inputted via the input device to a second voice data and transmit the second voice data to the second external electronic device.

In an embodiment, an electronic device is completed to include: a communication module; and a control circuit. The control circuit is configured to: receive a request for a second call from a second party while the electronic device is connected with a first party in a first call; and control the communication module to connect the second call with the second party while maintaining the first call, according to an input from a user of the electronic device, wherein the first call is connected in a first communication mode and the second call is connected in a second communication mode. The first communication mode is a voice communication mode and the second communication mode is a hybrid voice and text communication mode wherein a first voice data from the second party is converted to a first text data to be displayed on a display, and a second text data inputted by the user of the electronic device is converted to a second voice data and transmitted to the second party. In the second communication mode, the user of the electronic device performs the second call with the second party in a form of text conversation and the second party performs the second call with the user in a form of voice conversation. The control circuit further: after receiving the request for the second call from the second party during the first call, receive user input to accept the second call in the second communication mode; and connect the second call in the second communication mode based on the received user input. The control circuit includes: a speech-to-text (STT) module adapted to convert the first voice data from the second party to the first text data; and a text-to-speech (TTS) module adapted to convert the second text data inputted by the user of the electronic device to the second voice data. The control circuit is further configured to: request a third call to a third party according to input by the user; receive, from the third party, a request to connect the third call in a third communication mode; request confirmation from the user to connect the third call in the third communication mode; and when confirmation from the user is received, connect the third call in the third communication mode. In the third communication mode, the user of the electronic device performs the third call with the third party in a form of voice conversation and the third party performs the third call with the user in a form of text conversation. The STT module converts the third voice data from the user of the electronic device to the third text data and transmits the third text data to the third party during the third call. The TTS module converts the fourth text data from the third party to the fourth voice data and outputs the fourth voice data to the user during the third call. Before connecting the second or third call, the control circuit controls the communication module to register contacts of the user in a first server; receive a token from the first server; and transmits the token to a second server. The control circuit is further configured to: create a group of contacts when the user accepts the second call, the group of contacts include the first party and the second party; create a group identification (ID) corresponding to the created group; transmit the group ID to the second server; and connect the second call and merge the first call and the second call when the first party and the second party accepts participation in the group. The control circuit is further configured to: receive a group ID corresponding to a group of contacts created by the third party from the first server when the user accepts the third call; transmit a request to participate in the group to the second server; and connect the third call. The first call is connected via a first communication network and the second call is connected via a second communication network, the first communication network is a circuit switching (CS) network providing a voice call service; and the second communication network is a packet switching (PS) network providing a data transmission/reception service.

The following description provides a call service providing method of an electronic device according to one or more embodiments of the present disclosure.

Figure 6:
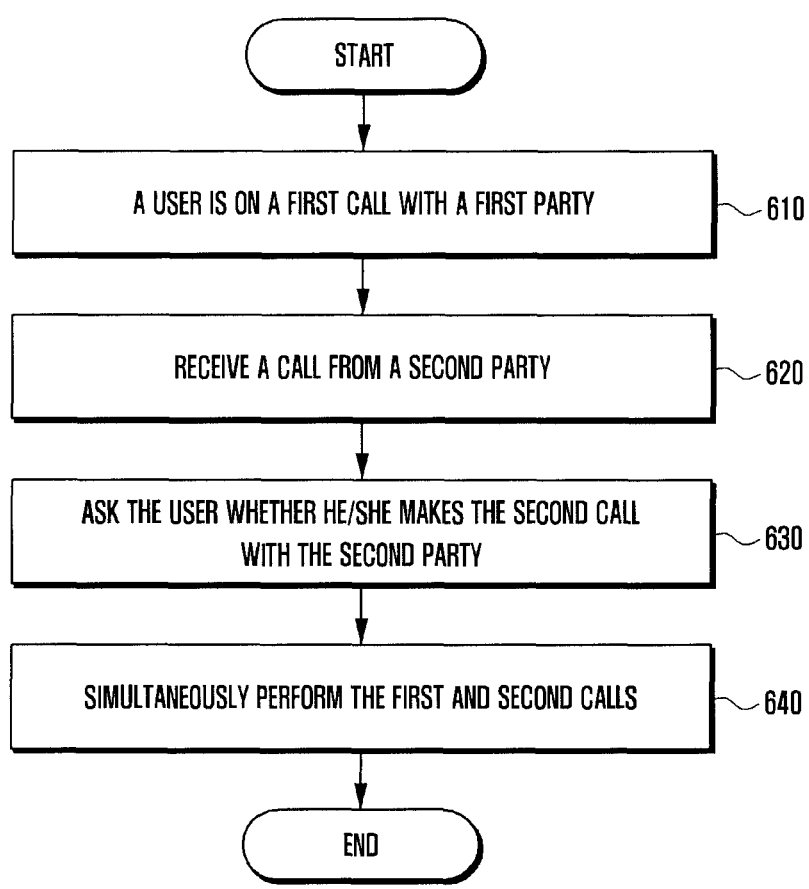
FIG. 6 is a flowchart that describes a call service providing method of an electronic device according to one embodiment of the present disclosure.
Figure 7:
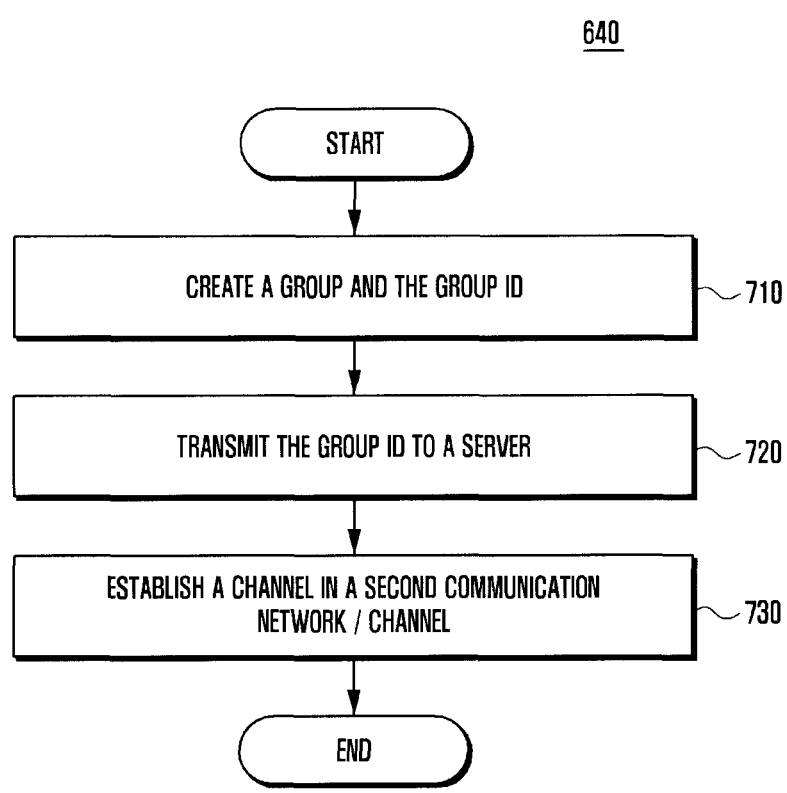
FIG. 7 is a flow diagram that describes a method of simultaneously performing first and second calls according to one embodiment of the present disclosure.

FIG. 6 is a flowchart that describes a call service providing method of an electronic device according to an embodiment of the present disclosure. FIG. 7 is a flow diagram that describes a method of simultaneously performing first and second calls according to one embodiment of the present disclosure. FIGS. 6 and 7 are flowcharts that describe the call service providing method of the electronic device 410 when the user of the electronic device 410 attempts to make a call to a second party while connected to a call with a first party.

The control circuit 510 is capable of controlling the communication module 520 and the audio module 550 to connect the user to the first call function with the first party in operation 610.

For example, the user of the electronic device may be listening to music using a hands-free accessory before being connected to the call to the first party. When the user receives a request for the call from the first party, he/she may be connected to the first call with the first party using the hands-free accessory. The first call may be in the voice call mode between the user and the first party. That is, both the user and the first party communicate by speaking into their respective electronic devices and hear the responses from each other. The first call may be connected via a first communication network, e.g., a circuit switching (CS) network. Alternatively, the first call may be connected via a second communication network, e.g., a packet switching (PS) network. Or the first call may be connected via a first channel in the first communication network. It should be understood that the first call may also be connected via any other types of communication network.

The control circuit 510 recognizes that a request for a second call has been received from a second party in operation 620.

The control circuit 510 notifies the user that the request for the second call has been received from a second party, and controls the display unit 540 to display a confirmation request asking the user whether he/she wishes to connect to the second call with the second party in a mode that differs from that of the first call in operation 630. For example, the second call may be connected in such a way that the user performs the second call with the second party in the form of text conversation and the second party performs the second call with the user in the form of voice conversation. Therefore, the confirmation request may be a message asking the user whether he/she accepts the second call with the second party in a text-speech conversion mode. The control circuit 510 controls the audio module 550 to output an audio message or a haptic module to output a vibration signal. When the user receives the audio message or the vibration signal, the user may connect the second call with the second party in a text-speech conversion mode.

The control circuit 510 is capable of simultaneously performing first and second calls according to a user's second call request in operation 640. To this end, when the control circuit 510 controls the communication module 520 to connect the second call and receives information that the second party has accepted the second call, it controls the communication module 520 to connect the first and second calls simultaneously.

Then for the second call, the call control module 512 of the control circuit 510 controls the TTS module 514 to convert text that the user input via the input device 560 into a voice signal, and transmits the converted voice signal to the electronic device of the second party via the second communication network. In another embodiment, the control circuit 510 or the TTS module 514 transmits the converted voice signal to the electronic device of the second party via a second communication channel of the first communication network.

The call control module 512 of the control circuit 510 controls the STT module 516 to convert voice data received from the second party, into text. The control circuit 510 or the STT module 516 can then cause the converted text to be displayed on the display unit 540. According to one embodiment of the present disclosure, the process of performing first and second calls may further include operations 710 to 730 as shown in FIG. 7.

The control circuit 510 is capable of creating a group of contacts and a group identification (ID) corresponding to the created group, according to a user's request in operation 710. The group may include the first party of the first call and the second party of the second call. The group is used to establish a channel through which the user makes a second call with the second party. Information regarding the group and the group ID is transmitted to the electronic devices of the first and second parties via a server. When the first party and the second party accepts participation in the group, the second call is connected and the first call and the second call are merged in a specified communication network or channel. The specified communication network/channel may be identical to or different from the communication network/channel that the user is currently using for the first call.

The control circuit 510 controls the communication module 520 to transmit the created group ID to the server 420 in operation 720. In this case, the server 420 is capable of transmitting the received group ID to the electronic device of the second party.

When a channel is established in the second communication network or a second channel in the first communication network is established, the control circuit 510 activates a second call in operation 730 and merges the first and second calls. The establishment of a channel in the second communication network or a second channel in the first communication network includes transmitting the group ID to the electronic device of the second party, and receiving a confirmation from the second party to participate in the group.

Figure 8:
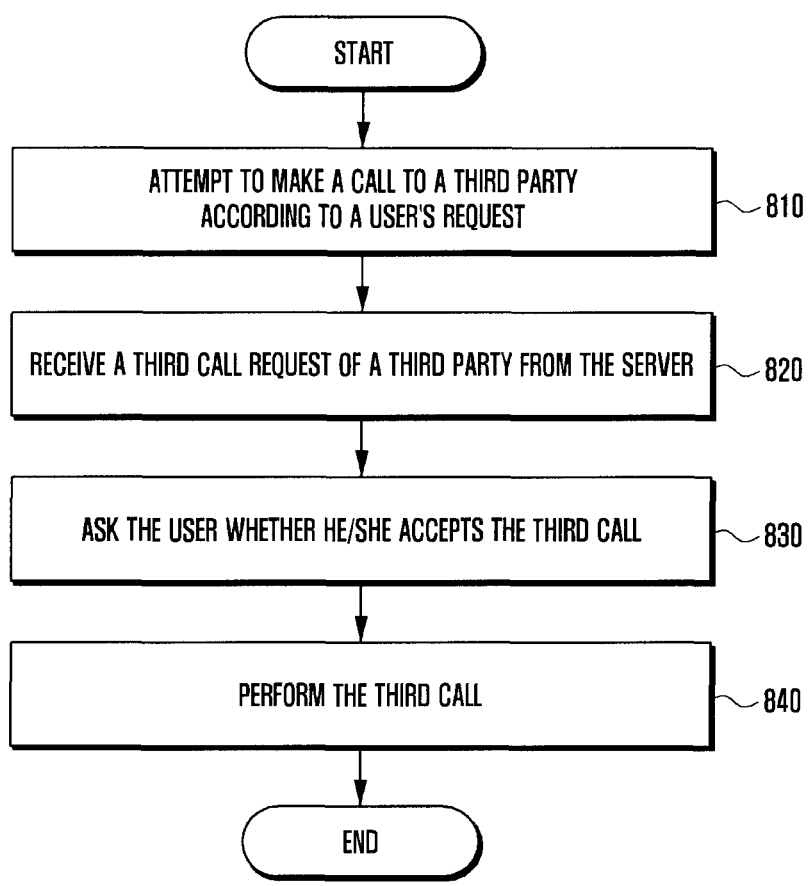
FIG. 8 is a flowchart that describes a call service providing method of an electronic device according to one embodiment of the present disclosure.
Figure 9:
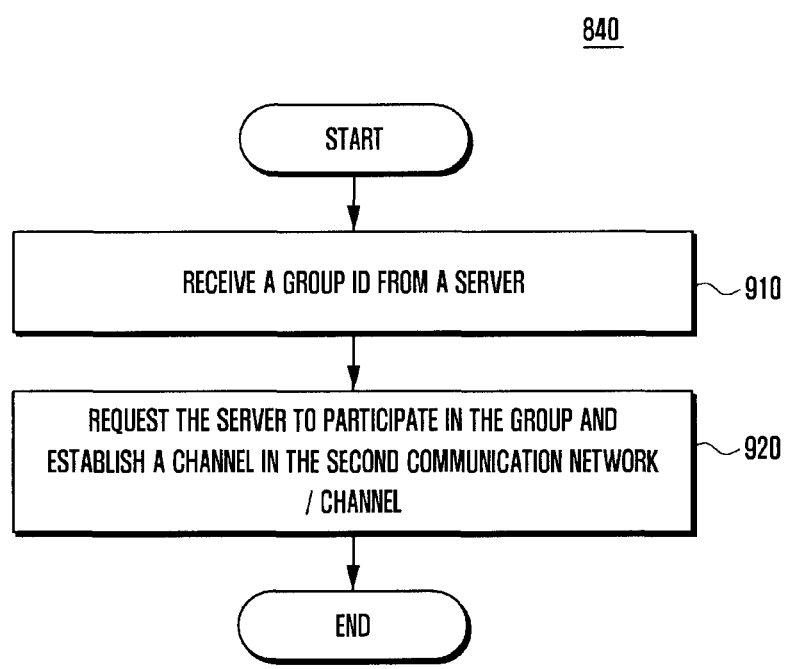
FIG. 9 is a flowchart that describes a method of performing a third call according to one embodiment of the present disclosure.

FIG. 8 is a flowchart that describes a call service providing method of an electronic device according to an embodiment of the present disclosure. FIG. 9 is a flow diagram that describes a method of performing a third call according to one embodiment of the present disclosure. FIGS. 8 and 9 are flowcharts that describe a call service providing method of an electronic device 410 when a user of the electronic device 410 attempts to initiate a call to a third party who is currently connected to another call.

The control circuit 510 attempts to connect a third call to a third party according to the user's request in operation 810.

The control circuit 510 receives a third call request of the third party in operation 820. For example, although the user wants to use a voice call with the third party, the third party is currently on a call with another party and may thus propose the third call with the user to be in the speech-text conversion mode.

The control circuit 510 shows a confirmation request asking the user whether he/she accepts the third call proposed by the third party in operation 830. The control circuit 510 is capable of informing the user that the third party has proposed the third call, which will not be in the normal voice call mode. The confirmation request may be a message asking the user whether he/she accepts the third call with the third party in the speech-text conversion mode. For the confirmation, the control circuit 510 may controls the audio module 550 to output an audio message or control a haptic module to output a vibration signal.

If confirmed by the user, the control circuit 510 is capable of performing the third call according to a user's request in operation 840. The STT module is capable of converting a speech input by the user into text data and outputting the converted text data during the third call. The call control module 512 of the control circuit 510 is capable of controlling the STT module 516 to convert a speech input by the user into text data and output the converted text data. The call control module 512 is also capable of controlling the TTS module 514 to convert text data received from the third party into speech and provide the speech to the user via a speaker.

According to one embodiment of the present disclosure, the process of performing a call may further include operations 910 and 920 as shown in FIG. 9.

The control circuit 510 is capable of receiving a group ID from the server 420 in operation 910. The group ID is an ID of a group created by the third user and is transmitted from the device of the third user to the server 420.

The control circuit 510 requests the server 420 to participate in the group and thus establishes a channel in the second communication network or a second channel in the first communication network in operation 920. When the channel is established, the user is connected to the third call to the third party in a speech-text conversion mode. The third party may merge the third call with the call he/she was connected to prior to the initiation of the third call. The third call is performed in such a way that the user performs the third call with the third party in the form of voice conversation and the third party performs the third call with the user in the form of text conversation.

Figure 10:
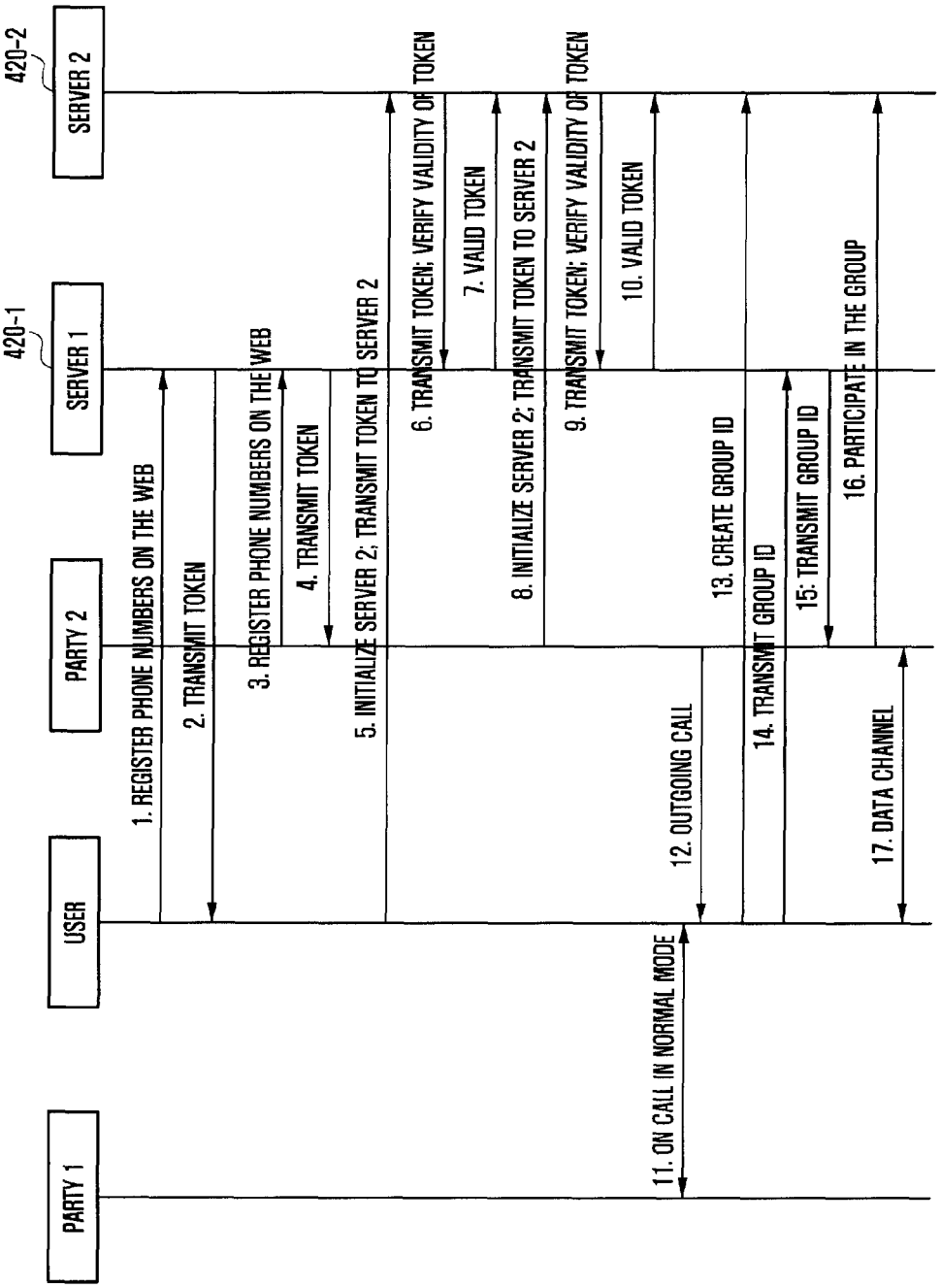
FIG. 10 is a flowchart that describes a call service providing method of an electronic device according to one embodiment of the present disclosure.

FIG. 10 is a flowchart that describes a call service providing method of an electronic device according to an embodiment of the present disclosure. More specifically, FIG. 10 is a flowchart that describes a call service providing method in a network environment including a number of entities according to an embodiment of the present disclosure.

With reference to FIG. 10, the control circuit 510 of the electronic device 410 is capable of performing the registration of contacts stored in the electronic device 410 of the user in the server 420-1 before making a second or third call described above. The registration of contacts is performed to facilitate the call services in a speech-text conversion mode or text-speech conversion mode. When the contacts of individual users are registered in the server 420-1, the users whose contacts have registered in the server 420-1 may make a second or third call between each other, as explained above, according to users' requests.

The control circuit 510 registers contacts of a user in the server 420-1 as follows. The control circuit 510 controls the communication module 520 to register contacts of a user in the server 420-1 (e.g., first server). After that, the control circuit 510 of the electronic device 410 receives a token from the server 420-1, and transmits the received token to the server 420-2 (e.g., second server). The server 420-2 (e.g., second server) checks the validity of the received token.

The operations between the electronic device 410 and the servers before performing a second call or a third call may also be performed by other parties' devices as well as the user's device.

When the server 420 ascertains that tokens transmitted from the electronic device 410 of the user and devices of other parties are valid, the user and parties are in a state where they can make a call to each other in a text-speech conversion mode or a speech-text conversion mode.

When the servers have recognized that individual tokens from the electronic device 410 of the user and devices of other parties are valid, the user may receive an incoming second call from a second party while on a first call with a first party in a voice call mode. When the user and the second party accept to make the second call in a text-speech conversion mode or a speech-text conversion mode, the electronic device 410 of the user creates a group and the group ID in the server 420-2 (e.g., second server) and transmits the created group ID to the server 420-1 (e.g., first server). In this case, the server 420-1 (e.g., first server) transmits the received group ID to the device of the second party. The device of the second party participates in the group of the server 420-1 (e.g., second server), using the received group ID. Therefore, the second communication network establishes a channel connecting between the user and the second party, so that the user performs the second call with the second party in a text-speech conversion mode and the second party performs the second call with the user in a speech-text conversion mode.

In the embodiment shown in FIG. 10, the first server may be an application server (AS) for performing functions of applications installed to the electronic device. The second server may be a Service Capability Server (SCS) for performing the transmission of messages, data, multimedia data, etc. for groups of electronic devices in a service provider network. Although the embodiment is implemented in such a way that the first and second servers are separated from each other, it should be understood that the first and second servers may also be integrated into a single server.

Figure 11:
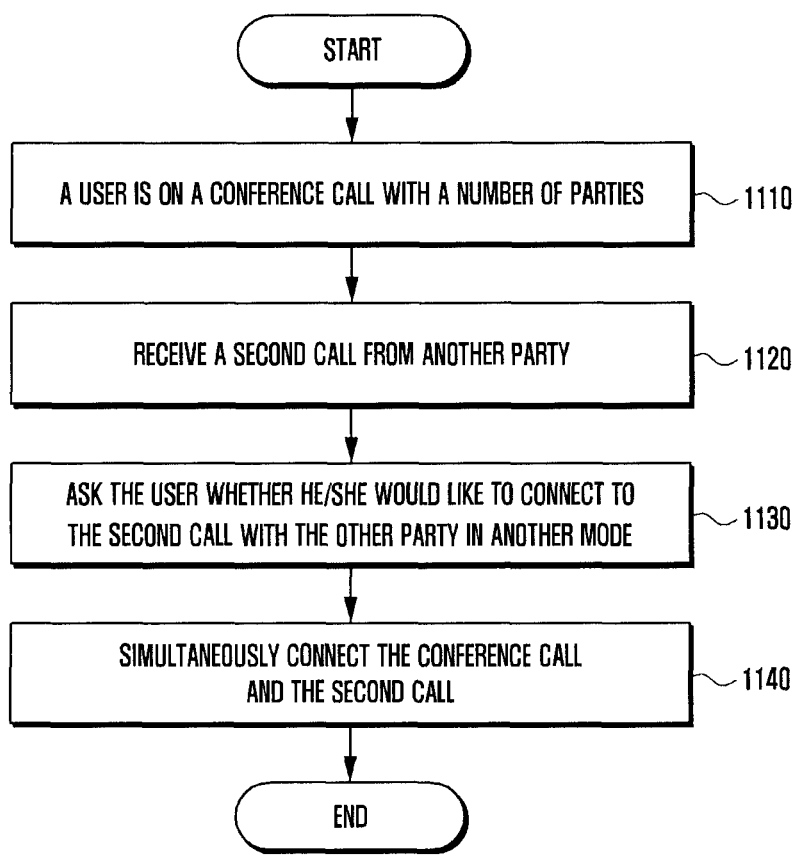
FIG. 11 is a flowchart that describes a call service providing method of an electronic device according to one embodiment of the present disclosure.

FIG. 11 is a flowchart that describes a call service providing method of an electronic device according to another embodiment of the present disclosure. More specifically, FIG. 11 is a flowchart that describes a service providing method of an electronic device 410 when a user of the electronic device 410 receives a call from another party while on a conference call with a number of parties.

The control circuit 510 controls the communication module 520 and the audio module 550 to provide the user with a conference call function with a number of parties in operation 1110. The conference call is a phone call where the user and a number of parties hear and talk to each other in voice mode. This type of conference call may be connected via a first communication network, e.g., a circuit switching (CS) network.

The control circuit 510 then recognizes that a call has been received from another party in operation 1120.

The control circuit 510 notifies the user that a call has been received from another party, and controls the display unit 540 to display a confirmation request asking the user whether he/she will connect to the second call with the other party in a mode that differs from that of the conference call in operation 1130. The second call may be connected in such a way that the user performs the second call with the other party in the form of text conversation and the other party performs the second call with the user in the form of voice conversation. Therefore, the confirmation request may be a message asking the user whether he/she accepts the second call with the other party in a text-speech conversion mode. For the confirmation message, the control circuit 510 controls the audio module 550 to output an audio message or controls a haptic module to output a vibration signal.

The control circuit 510 is capable of simultaneously performing a conference call and a second call according to a user's second call request in operation 1140. To this end, the control circuit 510 controls the communication module 520 to request the second call. When the control circuit 510 receives information that the other party has accepted the second call, it controls the communication module 520 to perform the conference call and the second call simultaneously.

Since the second call in operation 1140 is performed in a mode similar or identical to that as in operation 640 of FIG. 6, its detailed description is omitted hereinafter.

In an embodiment, a call service providing method of an electronic device is implemented to include: receiving a first call from a first external electronic device via at least one communication circuit; during the first call, receiving a request for a second call from a second external electronic device via the at least one communication circuit; receiving the second call based on input via an input device; converting a first voice data from the second external electronic device to a first text data and displaying the first text data on the display; and converting a second text data inputted via the input device to a second voice data and transmitting the second voice data to the second external electronic device In an embodiment, a call service providing method of an electronic device is implemented to include: providing a user of the electronic device with a first call from a first party; receiving a request for a second call from a second party while providing the first call; and controlling a communication module to connect the second call with the second party while maintaining the first call, according to an input from a user of the electronic device, wherein the first call is connected in a first communication mode and the second call is connected in a second communication mode. The process of control a communication module to connect the second call includes: after receiving the request for the second call with the second party during the first call, receiving user input to accept the second call in the second communication mode; and connecting the second call in the second communication mode based on the received user input. The method may be implemented to further include: requesting a third call to a third party according to input by the user; receiving, from the third party, a request to connect the third call in a third communication mode; requesting confirmation from the user to connect the third call in the third communication mode; and when confirmation from the user is received, connecting the third call in the third communication mode, wherein the third communication mode is a hybrid voice and text communication mode wherein a third voice data from the user of the electronic device is converted to a third text data transmitted to the third party, and a fourth text data from the third party is converted to a fourth voice data outputted by the electronic device. The method may be implemented to further include: registering, before connecting the second or third call, contacts of the user in a first server via the communication module; receiving a token from the first server; and transmitting the token to a second server. The method may be implemented to further include: creating a group of contacts when the user accepts the second call, the group of contacts include the first party and the second party; creating a group identification (ID) corresponding to the created group; transmitting the group ID to the second server; and connecting the second call and merge the first call and the second call when the first party and the second party accepts participation in the group. The method may be implemented to further include: receiving a group ID corresponding to a group of contacts created by the third party from the first server when the user accepts the third call; transmitting a request to participate in the group to the second server; and connecting the third call.

As described above, various embodiments of the present disclosure are capable of allowing a user of an electronic device to connect calls with a number of parties simultaneously, which include an existing call that the user has with a specified party and a new call that the user receives. Therefore, the user does not need to select one of a number of calls and hold or reject the other calls. Instead, the user may connect to one call in a voice mode and another call in a speech-text conversion mode. In addition, one or more embodiments of the present disclosure are capable of allowing the user to make another call on another topic during a conference call.

A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain embodiments thereof, it will be understood by those skilled in the art that various changes in form and detail may be made therein without departing from the spirit and scope of the invention as defined by the appended claims.

The invention claimed is:

1. An electronic device comprising:
at least one communication module;
a display; and
a control circuit,
wherein the control circuit is configured to:
receive a request for a second call from a second party while the electronic device is connected with a first party in a first call; and
control the at least one communication module to connect the second call with the second party while maintaining the first call, in response to an input from a user of the electronic device, wherein the first call is a voice communication mode and the second call is a hybrid communication mode in which a first voice data from the second party is converted to a first text data to be displayed on the display, and a second text data inputted by the user of the electronic device is converted to a second voice data to be transmitted to the second party.

2. The electronic device of claim 1, wherein in the hybrid communication mode, the user of the electronic device performs the second call with the second party in a form of text conversation and the second party performs the second call with the user in a form of voice conversation.

3. The electronic device of claim 1, wherein the control circuit is further configured to:
after receiving the request for the second call from the second party during the first call, receive user input to accept the second call in the hybrid communication mode; and
connect the second call in the hybrid communication mode based on the received user input.

4. The electronic device of claim 3, wherein the control circuit comprises:
a speech-to-text (STT) module adapted to convert the first voice data from the second party to the first text data; and
a text-to-speech (TTS) module adapted to convert the second text data inputted by the user of the electronic device to the second voice data.

5. The electronic device of claim 4, wherein the STT module and/or TTS module communicates with a server to perform the conversions.

6. The electronic device of claim 4, wherein the control circuit is further configured to:
request a third call to a third party according to input by the user;
receive, from the third party, a request to connect the third call in a third communication mode;
request confirmation from the user to connect the third call in the third communication mode; and
when confirmation from the user is received, connect the third call in the third communication mode.

7. The electronic device of claim 6, wherein the third communication mode is a hybrid communication mode in which a third voice data from the user of the electronic device is converted to a third text data to be transmitted to the third party, and a fourth text data from the third party is converted to a fourth voice data outputted by the electronic device.

8. The electronic device of claim 7, wherein in the third communication mode, the user of the electronic device performs the third call with the third party in a form of voice conversation and the third party performs the third call with the user in a form of text conversation.

9. The electronic device of claim 7, wherein:
the STT module converts the third voice data from the user of the electronic device to the third text data and transmits the third text data to the third party during the third call; and
the TTS module converts the fourth text data from the third party to the fourth voice data and outputs the fourth voice data to the user during the third call.

10. The electronic device of claim 9, wherein before connecting the second or third call, the control circuit controls the at least one communication module to register contacts of the user in a first server, receive a token from the first server, and transmit the token to a second server.

11. The electronic device of claim 10, wherein the control circuit is further configured to:
create a group of contacts when the user accepts the second call, the group of contacts including the first party and the second party;
create a group identification (ID) corresponding to the created group;
transmit the group ID to the second server; and
connect the second call and merge the first call and the second call when the first party and the second party accept participation in the group.

12. The electronic device of claim 10, wherein the control circuit is further configured to:
receive a group ID corresponding to a group of contacts created by the third party from the first server when the user accepts the third call;
transmit a request to participate in the group to the second server; and
connect the third call.

13. The electronic device of claim 3, wherein the first call is connected via a first communication network and the second call is connected via a second communication network, the first communication network being a circuit switching (CS) network providing a voice call service, and the second communication network being a packet switching (PS) network providing a data transmission/reception service.

14. A call service providing method of an electronic device comprising:
controlling at least one communication module to connect a first call with a first party;

receiving a request for a second call from a second party while maintaining the first call; and controlling the at least one communication module to connect the second call with the second party while maintaining the first call, in response to an input from a user of the electronic device, wherein the first call is a voice communication mode and the second call is a hybrid communication mode in which a first voice data from the second party is converted to a first text data to be displayed on a display of the electronic device, and a second text data inputted by the user of the electronic device is converted to a second voice data to be transmitted to the second party.

15. The method of claim 14, wherein in the hybrid communication mode, the user of the electronic device performs the second call with the second party in a form of text conversation and the second party performs the second call with the user in a form of voice conversation.

16. The method of claim 14, further comprising:

requesting a third call to a third party according to input by the user;

receiving, from the third party, a request to connect the third call in a third communication mode;

requesting confirmation from the user to connect the third call in the third communication mode; and when confirmation from the user is received, connecting the third call in the third communication mode, wherein the third communication mode is a hybrid communication mode in which a third voice data from the user of the electronic device is converted to a third text data to be transmitted to the third party, and a fourth text data from the third party is converted to a fourth voice data outputted by the electronic device.

17. The method of claim 16, wherein in the third communication mode, the user of the electronic device performs the third call with the third party in a form of voice conversation and the third party performs the third call with the user in a form of text conversation.

18. The method of claim 16, further comprising:

registering, before connecting the second or third call, contacts of the user in a first server via the at least one communication module;

receiving a token from the first server; and transmitting the token to a second server.

19. The method of claim 18, further comprising:

creating a group of contacts when the user accepts the second call, the group of contacts include the first party and the second party;

creating a group identification (ID) corresponding to the created group;

transmitting the group ID to the second server; and connecting the second call and merging the first call and the second call when the first party and the second party accepts participation in the group.

20. The method of claim 18, further comprising:

receiving a group ID corresponding to a group of contacts created by the third party from the first server when the user accepts the third call;

transmitting a request to participate in the group to the second server; and connecting the third call.

21. A computer-readable recording medium interfacing with an external system, storing a software program for executing processes of:

controlling at least one communication module to connect a first call with a first party;

receiving a request for a second call from a second party while maintaining the first call; and controlling the at least one communication module to connect the second call with the second party while maintaining the first call, in response to an input from a user of an electronic device, wherein the first call is a voice communication mode and the second call is a hybrid communication mode in which a first voice data from the second party is converted to a first text data to be displayed on a display of the electronic device, and a second text data inputted by the user of the electronic device is converted to a second voice data to be transmitted to the second party.

* * * * *